UNITED STATES PATENT OFFICE.

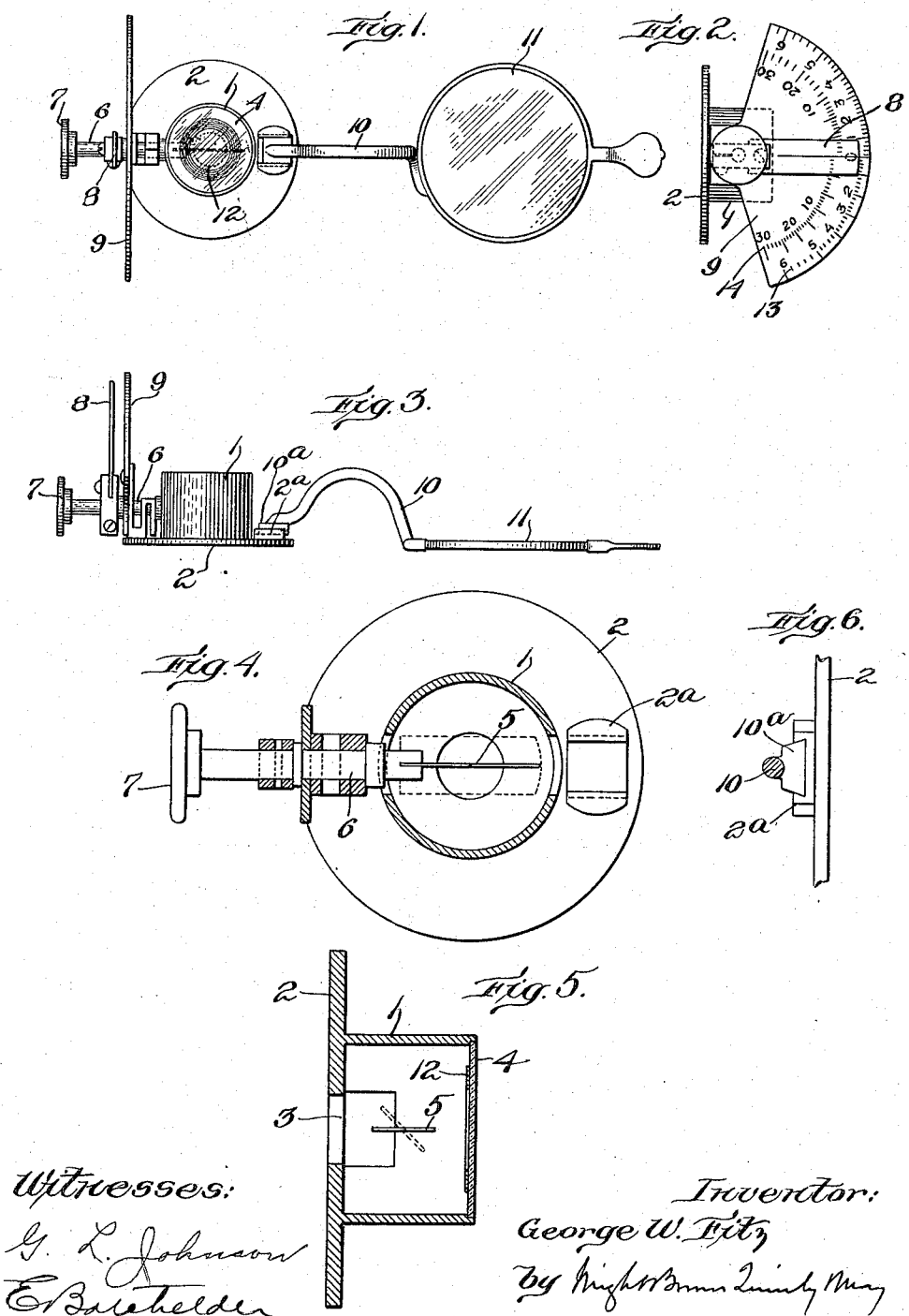

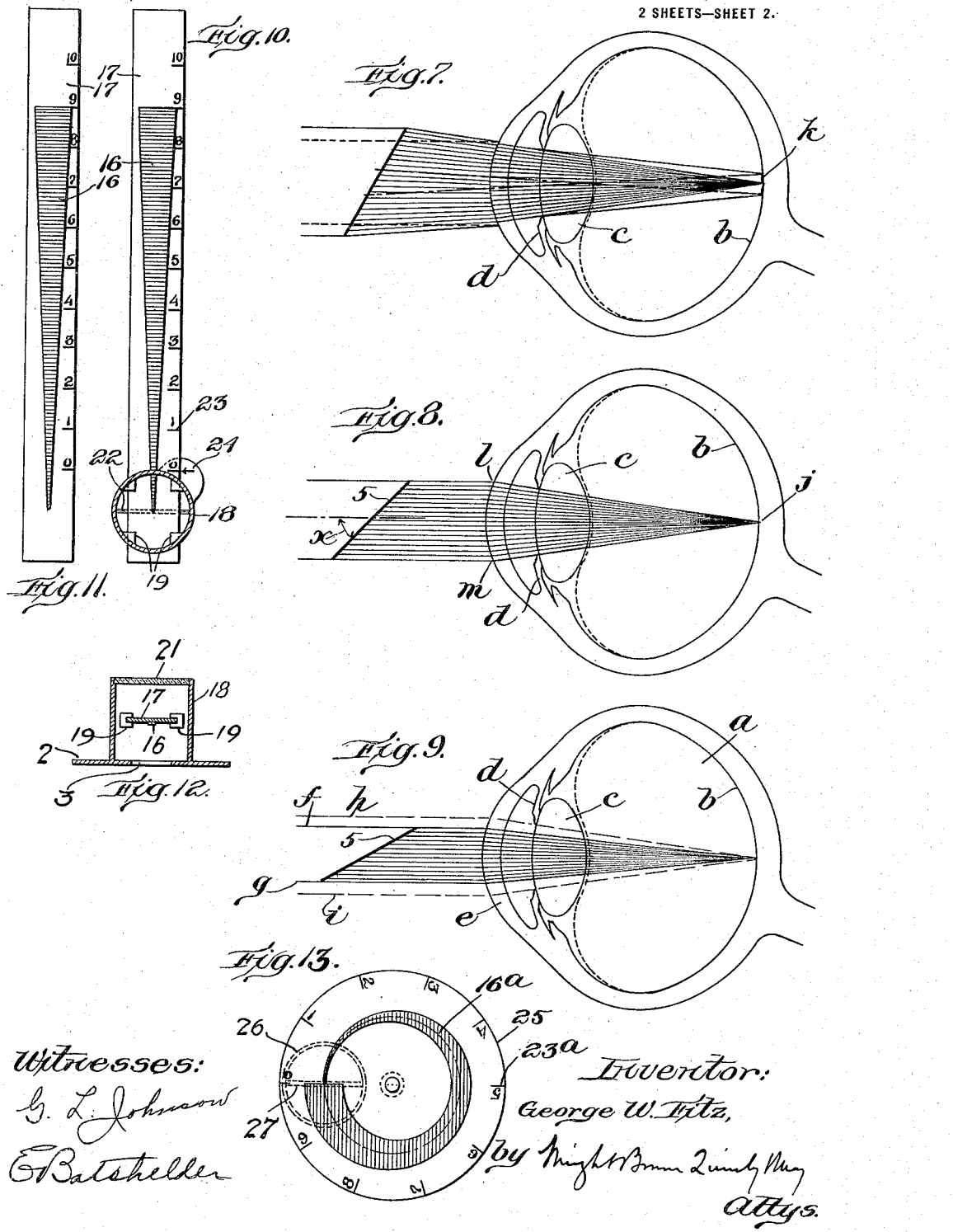

GEORGE W. FITZ, OF PECONIC, NEW YORK.

SHADOW-PUPILLOMETER.

1,192,512.

Specification of Letters Patent.

Patented July 25, 1916.

Application filed February 10, 1912. Serial No. 676,886.

*To all whom it may concern:*

Be it known that I, GEORGE W. FITZ, of Peconic, in the county of Suffolk and State of New York, have invented certain new and useful Improvements in Shadow-Pupillometers, of which the following is a specification.

The object of the present invention is to provide an instrument capable of measuring with a high degree of accuracy the apparent diameter of the pupil of the eye, and to do so under any conditions of intensity of illumination without causing the pupil to be either dilated or contracted beyond its normal size in such condition of illumination, during or by reason of the act of taking the measurement.

A further object is to eliminate the confusing effects of high lights reflected from the cornea of the eye, which in the objective method of taking measurements introduces a high degree of error into the results. I have accomplished the foregoing objects by providing an improved instrument capable of being used subjectively for direct measurement by the person whose pupil is under investigation.

The instrument which I have devised for the purpose above noted depends upon the fact, discovered and first formulated by myself, so far as I am aware, that an opaque object, when held closely in front of the eye (that is, within an inch), and in the axis of vision so as to intercept the light which enters the eye axially, will cast a real shadow upon the retina of the eye; and that such shadow will be apparently (subjectively) projected upon an illuminated space in the center of the visual field of the eye if the object so placed is equal in width to, or larger than, the pupil through which the light enters the eye. If the object be less in width or diameter than the pupil, no real shadow will be projected, since the object does not cut off all of the rays of light focused upon any point of the retina. Also the shadow cast on the retina by an object wider than the pupil and apparently projected as above mentioned will have a width approximately in proportion to the excess in width or diameter of the object over that of the pupil. Hence any suitable object which can be made to assume a series of different determined sizes or widths across the line of vision, can be used subjectively to measure the size of the pupil, for when the real or black shadow begins the width of the object is the same as that of the pupil.

The instrument in which this invention is embodied includes an object which may be held in front of the eye and is capable of being so manipulated as to apparently increase or diminish its width in front of the pupil, thereby intercepting more or less of the light rays passing to the pupil, together with a scale and indicator, relatively movable into various positions corresponding to the apparent width of the object, from which readings indicating the diameter of the pupil may be taken. Some of the possible specific forms of such instrument, all containing the essential principles of the invention, are indicated in the accompanying drawings, in which, Figure 1 is a front elevation of the instrument. Fig. 2 is a side view thereof. Fig. 3 is a top view thereof. Fig. 4 is a cross sectional view on an enlarged scale. Fig. 5 is a longitudinal section of the instrument, also on an enlarged scale, Fig. 6 is an elevation of a detail of constructions also on an enlargel scale, Figs. 7, 8, and 9 are diagrams illustrating the principle of operation of the instrument. Figs. 10, 11, and 12 show a modification. Fig. 13 represents another modification.

The same reference characters indicate the same parts in all figures.

An instrument having the characteristics above described, and capable of performing the functions mentioned, may have many specific forms and constructions. The one illustrated in Figs. 1 to 6 consists of a tube 1 at one end of which is secured a flat plate 2 having an aperture 3 in its center and in the other end of which is mounted a translucent screen 4. Contained in the tube 1 is an opaque object 5 which is conveniently and preferably a thin ribbon or strip of a material having sufficient stiffness to retain its original form mounted to rotate about an axis passing through its longitudinal center and so placed in the tube that its axis of rotation crosses the axis of the tube. Mechanically the strip 5 is attached to a pivot rod 6 which passes through a bearing in the side of the tube 1, and upon the outer end of which are secured a thumb screw 7 and pointer 8. Such pointer is adapted to travel over a scale plate 9 secured to the tube and having suitable graduations.

This instrument is adapted to be mounted in any of the test frames used by oculists and opticians, and is further provided with a coupling for connection to a frame 10 carrying a translucent screen 11. In use the frame is so held that the aperture 3 is directly in front, and in the axis of vision, of the pupil to be measured, and the translucent screen 11 is in front of the other eye of the subject. The translucent screens 4 and 11 are desirable to secure the best and most accurate results, as, while admitting substantially the full illumination equally to both eyes, they eliminate the disturbing effect of objects viewed by either eye during the process of making measurements. Their use, however, is not indispensable. Preferably the screen 4 has a broad opaque circular band 12 concentric with the axis of the tube, which centralizes the eye and brings the axis of vision as nearly as possible into coincidence with the axis of the tube. By thus centralizing the line of vision, this line is caused to intersect the axis of the opaque strip 5 approximately perpendicularly thereto, and the width of the shadow cast by the strip on the eye is an accurate projection of the strip, and is proportional to the angle made by the shorter dimension of the strip with the line of vision. In other words, as the strip and the graduations of the scale plate 9 are positioned with respect to the axis of the tube 1, this centralization of the line of vision in the same axis avoids an error which would be introduced if the line of vision made an angle with the axis of the tube.

In using the instrument the frame 10, or other trial frame to which the instrument may be applied, is placed in front of the subject's eyes, as above indicated, the strip 5 being first placed edgewise to the line of vision. Being very close to the eye, as previously noted, an image of the strip is not focused upon the retina, but all that the subject apparently sees is an indistinct gray shadow of considerable width. The thumb screw 7 is then turned to bring the strip obliquely to the axis of vision, being manipulated until the shadow on the retina becomes real. This occurs when the strip appears to the subject to become a fine but solid black line. In other words the manipulation of the thumb screw is continued until the indistinct gray shadow subjectively projected in the visual field of the eye is just on the point of becoming an opaque line. In this position the apparent width of the strip, which is the width of the area of the strip projected in the line of vision, is exactly equal to the apparent diameter of the pupil, and can be measured by the pointer 8 with reference to a scale on the plate 9. Such scale may be calculated in any desired unit. For instance it may show angular degrees of divergence from the axis of the tube, from which the projected width of the strip may be calculated by multiplying the natural sine of the angle by the total width of the strip. Or the scale may be made to represent directly these calculated values, and such is the character of scale which I prefer to use. Thus on the plate 9 is a scale 13 in which the graduations are spaced proportionately to the sines of angles, and numbered to give the projected widths of the strip, and thereby the pupil widths, in tenths of a millimeter. The zero of the scale is in the middle of the scale and the graduations run equally and oppositely therefrom to either side. I find it convenient also to have a second scale 14 of which the graduations are spaced correspondingly to those of the scale 13 and indicate the circular areas corresponding to the diameters in the scale 13. Thus at the same time the areas as well as the diameters of pupils under measurement may be read.

The optical principle of the apparatus is indicated in Figs. 7, 8, and 9, in each of which $a$ represents the eyeball, $b$ the retina, $c$ the crystalline lens, $d$ the iris, and $e$ the cornea of the eye. The opaque strip is indicated diagrammatically at 5 in each of these figures. The pupil opening is indicated by the blank space in the center of the iris. Where the strip is set at such an acute angle to the axis of vision as to cover less than the entire width of the pupil, it cuts off only the light rays contained between the limits $f$, $g$. The shadow of the strip is focused by the cornea and lens on the retina, but the shadow is so illuminated by light which passes both edges of the strip between the limits $f$, $h$ and the limits $g$ and $i$, that it is indistinct and appears to the subject only as a faint gray partial shadow or penumbra. When the strip is so turned as to cut off all of the parallel light rays within the area of the pupil, passing from a distant source of illumination, as indicated in Fig. 8, the shadow of the opaque object is focused in a solid line at $j$ on the retina. This shadow appears to the subject as a black line crossing the center of the field of vision. Finally when the strip is so turned as to overlie more than the entire width of the pupil, as shown in Fig. 7, a wide shadow $k$ is projected, which has the appearance of a band of greater or less width according to the amount by which the edges of the strip extend beyond the opposite boundaries of the pupil. Thus when the subject places the strip so that the shadow is on the point of appearing as a black line, the width of the strip projected on the cornea between the points *l* and *m* is equal to the apparent diameter of the pupil. This width, as can be readily understood from Fig. 8, is equal to the natural sine of the angle *x*, which the strip makes with the axis of vision, multiplied by the width of the strip. Of course this measurement gives the apparent diameter of the pupil, as the same is magnified by the cornea, but as the apparent diameter is the one which is used in the physiological, optical and psychological observations in which the measurement of the pupil plays a part, no error is introduced thereby. Besides, if required, the actual size of the pupil may be readily determined by calculation.

It is understood, of course, that the thickness of the strip 5 is so slight as to have no appreciable effect in the measurements. Conveniently it is not more than three thousandths of an inch and hence it appears practically as a line when viewed edgewise and, in this position, has much less width than the smallest pupil, even when such pupil is most contracted. In width, of course, the strip is greater than the widest pupil, and may be one quarter of an inch or more.

The invention may be embodied in other forms than in that above specifically described, all being according to the same principle. For instance, instead of employing a rotatable strip of uniform width, I may use an endwise movable wedge, as shown in Figs. 10 and 11. Here the wedge is conveniently an opaque strip 16 having a uniform taper to a point at one end, being thereby of a width which varies gradually between limits which are, respectively, less than the diameter of the smallest contracted pupil of any human eye, and greater than that of the largest dilated pupil, said strip being secured upon a transparent or translucent slide 17, passing across a tube 18 which has guides 19 for supporting the strip. The center line of the wedge strip 16 is perpendicular to the axis of the tube and intersects the same. Mounted at the end of the tube is a translucent screen 21 of ground glass or the like, on which is an opaque cross line 22 of which the projection is perpendicular to the center line of the wedge strip and crosses the axis of the tube. This cross line is observed by the subject simultaneously with the wedge. The tube is mounted upon a plate 2 having an aperture or eyehole 3, as previously described. When held close to the eye in the manner already described, the wedge appears to have a hazy grayish outline within which is a dark wedge. The strip is moved across the tube until the point of the dark wedge appears to cross the sighting line 22. In this position the width of the wedge strip where it crosses the line 22 is equal to the diameter of the pupil, and this width is read off from a scale 23 on the edge of the slide 17 in conjunction with an index 24. The optical principles according to which this form of the invention depends are the same as above described.

A variant of the above described embodiment of the invention is indicated in Fig. 13, where, in place of the slide 17, there is a substantially circular transparent or translucent plate or disk 25 having an opaque area 16ª, corresponding as to its varying width, essentially to the wedge 16, in the form of a curved wedge of which the median line is the circumference of a circle and the bounding edges are spirals equally and oppositely divergent from the median line. Such curved opaque area may be termed descriptively, for the purposes of this invention, a circular wedge; and it may be produced by an imprint in the proper form on the disk with a dark pigment, or by otherwise applying a substantially opaque layer or body having the required outline. The disk is mounted rotatably at its center (and the center of curvature of the wedge) on any suitable kind of support which will allow it to be held near the eye without interfering with the general illumination of the eye and permit it to be rotated while so held, and which is also equipped with an index adapted to show the width of that part of the wedge which is in the axis of vision, in conjunction with a scale 23ª on the disk near its periphery. The dotted circle 26 shown in Fig. 13 over the left-hand part of the disk represents a means, such as the tube 18 of Figs. 10 and 12 or the circular band 12 of Fig. 1, for centralizing the eye; and the dotted cross line 27 in the diameter of this dotted circle represents both a sighting line, such as the line 22 of Fig. 10, and an index for reading, in connection with the figures and graduations of scale 23ª, the width of that part of the wedge which crosses the sighting line. It happens that, in the representation of the instrument shown in Fig. 13, the sighting line and index 27 is radial to the disk, and that, consequently, the figures of scale 23ª are beside those parts of the wedge of which they represent the widths, but it is evidently not material to the invention whether the index coincides with the sighting line and is on the same side of the axis, or not, nor is it material whether the figures of the scale are beside the corresponding points of the wedge, or are out of phase with such points (as shown in Figs. 10 and 11) to co-act with an index otherwise located than as shown in Fig. 13. The only difference in manner of use of the instrument made according to Fig. 13 from that of the instrument according to Figs. 10 to 12, is that in the former, the member carrying the wedge (the disk 25) is rotated instead of being moved in a straight line.

There is considerable latitude permitted in the distance which may exist between the opaque object and the eye, the only limit being that the opaque object must not be so far away that its apparent size is reduced in any material degree by distance. When located at any point not more than an inch away from the eye, the opaque object will perform its function satisfactorily and accurately.

In this specification and in the following claims the term "opaque" is used descriptively and in a relative sense merely. The purpose of the opaque element, whether in the form of the strip shown in Figs. 1, 4, and 5, or of an area as shown in Figs. 10, 11, and 13, is to shut off enough light from the illumination of the eye to form a shadow on the retina. It is obvious therefore that any element which performs the office of casting such a shadow is the equivalent of the opaque object or area hereinbefore described, whether it is opaque in the absolute sense of cutting off all light, or only opaque to the extent of diminishing the illumination of the eye. The term "opaque" as used in the following claims and here defined, is intended to include any object or area which intersects or obstructs enough light to enable the described shadow to be thrown upon the retina of the eye.

In that aspect of my invention which relates to the wedge strip 16, the circular wedge 16ª, the circular band 12, and the sighting lines 22 and 27, it is within the scope of the invention to form such portions or areas by any means or of any material whatever which is adapted to secure essentially the effects hereinbefore described, of obstructing light sufficiently to cast a shadow on the retina of the eye.

Realizing that the principles of my invention may be embodied in many diverse forms, I declare that I do not intend to confine the scope of my invention to the specific forms or embodiments herein illustrated and described, and that any instrument having adjustable means for producing a shadow of variable width on the retina of the eye, without appreciably diminishing the full illumination of the eye, and having means of any sort for determining the width, either actual or apparent, of that portion of such means which produces the shadow, is within the scope of my invention, and is covered by the broader of the appended claims.

An instrument having the characteristics and used as hereinbefore described affords a means of easily making quick and accurate determinations of pupil diameters and areas. It gives instantaneous recognition of variations in the size of the pupil, and at the same time enables such variations to be measured. If during the act of measurement the pupil contracts, the shadow of the opaque object widens by an amount equal or proportional to the excess in apparent width of such object over the width of the pupil. The subject can easily learn to estimate the width of the shadow, and thus determine the width of the pupil instantaneously while contractions or dilations are in progress. In comparison with any of the known methods of objective pupil measurement, this instrument and the method of measurement practised with its use are the acme of simplicity. In objective measuring the observer must view both edges of the pupil at the same time, and compare the same with a scale. These comparisons are rendered exceedingly difficult by high lights reflected from the cornea which frequently make it impossible to distinguish the boundary of the pupil, and they cannot be made rapidly enough to give accurate determinations of rapidly changing pupil diameters. In using the shadow pupillometer the subject has only to observe one thing, which is the shadow of the opaque object, and to note either when the distinct black shadow becomes a line with substantially no width, or to estimate the width when the shadow is a band.

I claim,—

1. An instrument for measuring the pupil of the eye, comprising an opaque object, means for holding such object closely in front of the eye in the axis of vision, and at the same time permitting the general illumination to remain unchanged, such object being so movable as to intercept more or less of the light rays entering the eye, and means for indicating the width of that portion of the object in the axis of vision, or of the projection thereof perpendicular to such axis.

2. An instrument for measuring the pupil of the eye, comprising an opaque object, a holder therefor adapted to be so placed with respect to the eye as to hold the opaque object in the axis of vision in such position that a shadow of the object is cast on the retina, without changing appreciably the general illumination of the eye and therefore without causing a change in the size of the pupil, said object being movable to intercept more or less of the light rays equally on both sides of the axis of vision, and an indicator, arranged to show the width, perpendicular to the axis of vision, of that part of the object which crosses the axis of vision.

3. An instrument for measuring the pupil of the eye, comprising an opaque object adapted to be held close to the eye across the axis of vision, without appreciably interfering with the general illumination of the eye, and so movable as to vary the extent of projection thereof transverse to such axis, and indicating means whereby such extent of projection may be determined.

4. A method of measuring the diameter of the pupil of the eye, which consists in holding an opaque object in the axis of vision and so close to the eye as to cause its shadow to be projected on the retina, without appreciably diminishing the general illumination of the eye, enlarging or diminishing the interceptive area of the object until an opaque shadow of the same, having substantially no width, appears projected in the field of vision, and determining the width of such interceptive area.

5. A method of measuring the pupil of the eye, which consists in holding an opaque object in the axis of vision within an inch of the eye, whereby a shadow of the object is thrown on the retina, causing that part of the object lying directly in the axis of vision to be altered in width till such part appears to the subject as an opaque point substantially without width, and finding the width, projected in the axis of vision of such part.

6. An apparatus for measuring the pupil of the eye, comprising an opaque object adapted to be placed in the axis of vision and so movable that the portion in such axis may be made less, equal to, or greater in width than the pupil, and a holder therefor adapted to be placed in such proximity to the eye that a shadow of the opaque object is produced on the retina having a distinct width when the width of the object is greater than the pupil, and which vanishes when the width of the object is substantially equal to that of the pupil.

7. An instrument of the character described comprising a tube adapted to be placed in front of the eye with its axis in the axis of vision, an opaque object having its center line transverse to the axis of the tube and intersecting such axis, said body being further movable to increase or diminish the extent to which it projects on each side of the axis, and means for determining the extent of such projection of that portion which lies in the axis.

8. An instrument of the character described, comprising a tube having an eye aperture at one end, an opaque object mounted with its center line crossing the axis of the tube and approximately perpendicular thereto, said object having greater width than thickness, and being adjustable whereby its width perpendicular to the axis of the tube may be varied, and an indicator movable with the object for determining the width perpendicular to said axis of that part of the object which lies in said axis.

9. An instrument of the character described, comprising a tube having an eye aperture at one end, an opaque object mounted with its center line crossing the axis of the tube and approximately perpendicular thereto, said object being of varying width and being movable across the axis of the tube in the direction of its center line, whereby parts of different widths are placed in the plane of the axis, and indicating means arranged to show the width of that portion of the object which lies at any time in the axis.

10. An instrument for measuring the pupil of the eye, comprising an opaque object, and a holder for said object constructed to permit substantially the full illumination of the eye to pass the object, adapted to be placed close to the eye, and having means for centralizing the line of vision; said object being movable across the line of vision in a manner such as to vary the extent to which that part thereof which is in the axis of vision projects transversely to the axis of vision.

11. An instrument of the character described, comprising a holder, and an opaque object mounted on said holder and adapted to be brought therewith close to the eye without sensibly diminishing the general illumination of the eye, said opaque object having a gradually increasing width from one end to the other and being movable in the direction of its length with respect to the holder and across the axis of vision.

12. An instrument of the character described, comprising a holder, and an opaque object mounted on said holder and adapted to be brought therewith close to the eye without sensibly diminishing the general illumination of the eye, said opaque object having a gradually increasing width from one end to the other and being curved in a circular arc, being also movable relatively to the holder rotatably about its center of curvature and across the axis of vision.

13. An instrument of the character described, comprising a holder, and an opaque object mounted on said holder and adapted to be brought therewith close to the eye without sensibly diminishing the general illumination of the eye, said opaque object having a gradually increasing width from one end to the other and the holder and opaque object having coöperating index and graduations showing the width of any part of the object which lies in the axis of vision.

14. An instrument of the character described comprising a holder adapted to be placed close to the eye constructed to permit passage of sufficient light to give substantially the full illumination to the eye, and a translucent member mounted movably on said holder having an opaque area increasing gradually in width from a width less than that of the smallest contracted pupil to a width greater than the largest dilated pupil, arranged with its center, or median, line in the axis of vision, when the holder is properly placed before the eye, and said member being so movable as to carry the opaque area across the axis of vision.

15. An instrument of the character described comprising a holder adapted to be placed close to the eye constructed to permit passage of sufficient light to give substantially the full illumination to the eye, said holder having a sighting line adapted to be placed in the axis of vision, and a translucent member mounted movably on said holder so as to move transversely to the axis of vision and having a substantially opaque area or portion of which the width varies gradually between limits respectively less than the smallest contracted pupil and greater than the largest dilated pupil, which opaque portion crosses the sighting line and is movable across the same.

16. An instrument of the character described comprising a holder adapted to be placed close to the eye constructed to permit passage of sufficient light to give substantially the full illumination to the eye, said holder having a sighting line adapted to be placed in the axis of vision and having also an index, and a translucent member mounted movably on said holder so as to move transversely to the axis of vision and having a substantially opaque area or portion of which the width varies gradually between limits respectively less than the smallest contracted pupil and greater than the largest dilated pupil, which opaque portion crosses the sighting line and is movable across the same, and the translucent member having a scale designating widths of various parts of the opaque portion and arranged to indicate, in connection with said index, the width of that part of the opaque portion which crosses the sighting line.

17. An instrument of the character described comprising a holder adapted to be placed close to the eye constructed to permit passage of sufficient light to give substantially the full illumination to the eye, and a translucent disk pivoted to said holder to move rotatably in a plane transverse to the axis of vision, said disk having an opaque area, concentric with the pivot of the disk and varying gradually in width between limits respectively less than the smallest contracted pupil and greater than the largest dilated pupil.

18. An instrument of the character described comprising a holder adapted to be placed close to the eye constructed to permit passage of sufficient light to give substantially the full illumination to the eye, and a translucent disk pivoted to said holder to move rotatably in a plane transverse to the axis of vision, said disk having an opaque area concentric with the pivot of the disk and varying gradually in width between limits respectively less than the smallest contracted pupil and greater than the largest dilated pupil, said disk having a scale showing the width of the opaque area at different points and the holder having a sighting line and index arranged to cross the opaque area and lie beside that scale indication which shows the width of the portion of the opaque area crossing the sighting line.

19. An instrument of the character described comprising a holder adapted to be placed close to the eye and constructed to permit passage of sufficient light to give substantially the full illumination to the eye and bearing a sighting line adapted to obstruct a translucent member mounted movably on said holder and having a passage of light area of progressively varying width, the longitudinal center line of which crosses said sighting line, and said member being so movable as to carry such area across the sighting line, and means associated with said holder and member for indicating the width of that portion of the area which lies across the sighting line.

In testimony whereof I have affixed my signature, in presence of two witnesses.

GEORGE W. FITZ.

Witnesses:
ARTHUR H. BROWN,
P. W. PEZZETTI.

Copies of this patent may be obtained for five cents each, by addressing the "Commissioner of Patents, Washington, D. C."